(12) United States Patent
Karagoulis et al.

(10) Patent No.: US 10,272,515 B2
(45) Date of Patent: Apr. 30, 2019

(54) POWER PULSE METHOD FOR CONTROLLING RESISTANCE WELD NUGGET GROWTH AND PROPERTIES DURING STEEL SPOT WELDING

(71) Applicant: GM GLOBAL TECHNOLOGY OPERATIONS LLC, Detroit, MI (US)

(72) Inventors: Michael J. Karagoulis, Okemos, MI (US); David R. Sigler, Shelby Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 635 days.

(21) Appl. No.: 14/854,467

(22) Filed: Sep. 15, 2015

(65) Prior Publication Data
US 2017/0072502 A1 Mar. 16, 2017

(51) Int. Cl.
| B23K 11/11 | (2006.01) |
| B23K 11/16 | (2006.01) |
| B23K 103/04 | (2006.01) |

(52) U.S. Cl.
CPC .......... *B23K 11/115* (2013.01); *B23K 11/16* (2013.01); *B23K 2103/04* (2018.08)

(58) Field of Classification Search
CPC ... B23K 11/115; B23K 11/16; B23K 2203/04; B23K 11/163; B23K 11/166; B23K 11/24; B23K 11/241
USPC ...................... 219/91.2, 117.1, 118, 108–110
See application file for complete search history.

(56) References Cited

U.S. PATENT DOCUMENTS

| 2011/0303655 A1* | 12/2011 | Kanai | B23K 11/115 |
| | | | 219/660 |
| 2015/0158110 A1* | 6/2015 | Kang | B23K 11/093 |
| | | | 219/91.2 |
| 2015/0174690 A1* | 6/2015 | Furusako | B23K 11/16 |
| | | | 219/91.22 |
| 2015/0217396 A1* | 8/2015 | Okada | B23K 11/115 |
| | | | 403/271 |
| 2015/0352654 A1* | 12/2015 | Onishi | B23K 11/115 |
| | | | 219/130.01 |
| 2016/0250709 A1* | 9/2016 | Matsushita | B23K 11/115 |
| | | | 219/86.1 |
| 2016/0271719 A1* | 9/2016 | Taniguchi | B23K 11/115 |

\* cited by examiner

*Primary Examiner* — Ibrahime A Abraham
*Assistant Examiner* — Biniam B Asmelash
(74) *Attorney, Agent, or Firm* — Reising Ethington P.C.

(57) ABSTRACT

A method of resistance spot welding steel workpieces—at least one of which includes a high-strength steel substrate having a tensile strength of 1000 MPa or greater—involves passing a pulsating DC electrical current between a pair of aligned welding electrodes that are pressed against opposite sides of a workpiece stack-up that includes the steel workpieces. The pulsating DC electrical current delivers sufficient power through the weld site by way of electrical current pulses to initiate and grow a molten steel weld pool at each faying interface within the workpiece stack-up that solidifies into a weld nugget of uniform hardness. In other words, each of the weld nuggets formed by the pulsating DC electrical current does not include soft, coarse, and alloy deficient shell regions that tend to reduce the strength of the weld nugget.

16 Claims, 7 Drawing Sheets

POWER PULSE METHOD FOR CONTROLLING RESISTANCE WELD NUGGET GROWTH AND PROPERTIES DURING STEEL SPOT WELDING

TECHNICAL FIELD

The technical field of this disclosure relates generally to resistance spot welding and, more particularly, to a method of resistance spot welding steel workpieces.

BACKGROUND

Resistance spot welding is a process used by a number of industries to join together two or more metal workpieces. In particular, spot welding has been used for decades by the automotive, aviation, maritime, railway, and building construction industries, among others, to join together steel workpieces in the manufacture of both load-bearing and non-load-bearing structural assemblies. For example, the automotive industry often uses resistance spot welding to join together pre-fabricated steel workpieces during the manufacture of a vehicle door, hood, trunk lid, or lift gate, as well as during the manufacture of various structural body members included in the vehicle frame. Recently, advances in steel technology have greatly expanded the types and grades of steel that are available to meet any of a wide range of potential end-uses, including those classified (by tensile strength) as high strength steel.

Resistance spot welding, as applicable in the context of steel-to-steel spot welding, relies on the resistance to the flow of an electrical current through overlapping steel workpieces and across their faying interface(s) to generate heat. To carry out such a welding process, a pair of opposed spot welding electrodes are typically pressed under force against facially aligned spots on opposite sides of the workpiece stack-up, which typically includes two or three steel workpieces arranged in lapped configuration, at a predetermined weld site. An electrical current is then passed through the steel workpieces from one electrode to the other. Resistance to the flow of this electrical current generates heat within the steel workpieces and at their faying interface(s). The heat generated at each faying interface initiates a molten steel weld pool that grows and penetrates into each adjacent steel workpiece. The molten steel weld pool eventually solidifies into a weld nugget upon cessation of the electrical current flow. The solidified weld nugget autogenously fuses the workpieces together at the weld site.

The weld schedule that defines the characteristics of the electrical current passed between the welding electrodes has been found to affect the strength—particularly the peel strength—of the final weld nugget. In conventional steel spot welding operations, for instance, the electrical current has typically been passed between the electrodes at a constant current, usually somewhere between 4 kA and 14 kA, for a duration of 150 ms to 1000 ms. A constant-current weld schedule of this kind can in fact initiate and grow a molten steel weld pool at the faying interface(s) of the workpiece stack-up. But as the spot welding process proceeds towards completion and the electrodes further impress into their respective engaged workpiece surfaces, the current density of the flowing electrical current drops as does the power delivered by the electrical current. When this happens, particularly in conjunction with certain grades of high-strength steel that have high carbon contents, the steel alloy weld pool can stop growing and the electrodes, which are typically water-cooled, begin to extract heat from the weld pool faster than the electrical current can generate heat within the weld pool.

The premature drop in current density and power delivery combined with the extraction of heat by the electrodes causes the molten steel weld pool to recede as the outer regions of the weld pool begin to solidify at a relatively slow rate. The ultimately-formed weld nugget thus includes a series of soft, coarse, and alloy deficient shell regions, which are formed during current flow. Typically, these shell regions surround an interior nugget core region formed by way of rapid quenching after the cessation of current flow. The softer shell regions have been found to be more susceptible to crack propagation and tearing, particularly when located near the weld nugget periphery, than the harder interior nugget core region. Certain high-strength steels—such as, for example, steels with a tensile strength of 1000 MPa or greater and in particular those steels having a carbon content of 0.2 wt % or greater—are more likely to contribute to the formation of weld nuggets that include soft, coarse, and alloy deficient shell regions due to their high carbon content and the consequence that such a high carbon content can have on the weldability of steel.

SUMMARY OF THE DISCLOSURE

A method of resistance spot welding a workpiece stack-up that includes two or three overlapping steel workpieces—at least one of which includes a high-strength steel substrate having a tensile strength of 1000 MPa or greater—is disclosed. In preparation for spot welding, the steel workpieces are assembled in superimposed fashion so that the faying surfaces of adjacent workpieces within the stack-up overlap and confront each other to establish one or two faying interfaces depending on whether the stack-up includes two or three steel workpieces. Additionally, as will be appreciated by skilled artisans, the steel workpieces may be provided by separate and distinct parts or, alternatively, two of the workpieces may be provided by the same part. Two workpieces can be provided by the same part when, for example, an edge region of one part is folded over an edge of another part to form a workpiece stack-up having three overlapping workpieces.

Once the workpiece stack-up is assembled, a weld gun that carries a pair of spot welding electrodes is operated to spot weld the workpieces together at a weld site, which results in the formation of a discrete fusion weld joint between the workpieces at that location. More specifically, one welding electrode is pressed against one side of the workpiece stack-up, and another welding electrode is pressed against the other side of the workpiece stack-up. The two welding electrodes are facially aligned and pressed together to exert a clamping force at the weld site. An electrical current is passed between the opposed welding electrodes and through the workpiece stack-up which, in turn, resistively heats the steel workpieces and results in the creation of a molten steel weld pool at the faying interface of each adjacent pair of steel workpieces. The characteristics of the passing electrical current are controlled by a weld controller according to a programmed weld schedule. Here, in the disclosed method, a pulsating DC electrical current is input into the weld schedule and carried out during the spot welding process, as opposed to employing a conventional current that rapidly ascends to, and is then maintained at, a constant current level.

The pulsating DC electrical current employed in the disclosed method is devised to deliver power over time that is sufficient to grow a molten steel weld pool while minimizing or altogether preventing the weld pool from solidifying at a relatively slow rate in successive stages as the welding electrodes continue to impress into their respective steel workpieces during current flow. As a result, the molten steel weld pool is at its maximum diameter at the end of current flow and can then be rapidly quenched into a more uniform weld nugget that does not include soft, coarse, and alloy deficient shell regions like those typically observed when a conventional constant current weld schedule is employed. Indeed, here, the steel weld nugget has a uniform hardness in which the hardness of any location of the weld nugget does not vary by more than 10%, and preferably does not vary by more than 5%, from the hardness of the center of the weld nugget, as measured by Vickers hardness. Such a uniform hardness provides the weld nugget with conforming strength and structural properties that are consistently attainable.

DETAILED DESCRIPTION

A method of resistance spot welding a workpiece stack-up 10 that includes two or three steel workpieces is depicted in FIGS. 1-11 and described below. The disclosed method calls for passing a pulsating DC electrical current between facially aligned spot welding electrodes that are pressed against exterior surfaces of overlapping steel workpieces located on opposite sides of the workpiece stack-up 10. The pulsating DC electrical current is controlled to initiate and grow a molten steel weld pool at each faying interface within the workpiece stack-up 10. And to help ensure that a strong weld nugget is obtained from each of the molten steel weld pools, the pulsating DC electrical current is programmed to include electrical current pulses that ensure the power delivered by the pulsating DC electrical current through the weld site of the workpiece stack-up does not decrease with time (as the welding electrodes continue to impress into the stack-up) to the point where the molten steel weld pool(s) begins to slowly solidify into soft, coarse, and alloy deficient shells. These electrical current pulses are designed such that the molten steel weld pool at each faying interface achieves its maximum diameter upon cessation of current flow, thus allowing the entire weld pool to solidify rapidly upon current cessation into a weld nugget with a more uniform hardness profile. The particular characteristics of the pulsating DC electrical current and its electrical current pulses can be tailored to the specific steel compositions of the workpieces involved.

Figure 1:
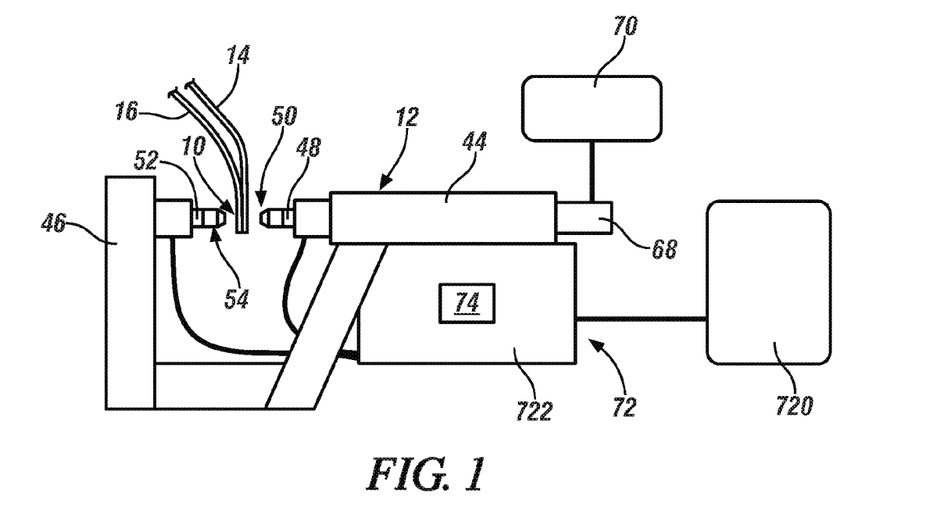
FIG. 1 is a schematic illustration of a workpiece stack-up, which includes at least two overlapping steel workpieces, that is set to be resistance spot welded according to one embodiment of the disclosure.
Figure 2:
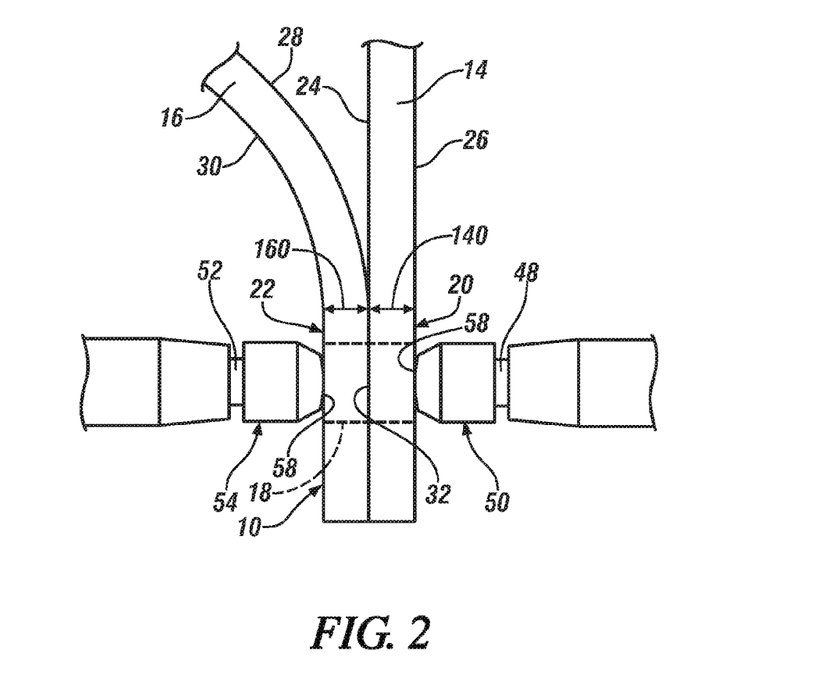
FIG. 2 is a partial magnified view of the workpiece stack-up shown in FIG. 1 with the welding electrodes carried by a weld gun engaged with opposite sides of the workpiece stack-up.

Referring now to FIGS. 1-2, the workpiece stack-up 10 is shown along with a weld gun 12 that is mechanically and electrically configured to conduct resistance spot welding method in accordance with a weld schedule programmed to carry out the desired pulsating DC electrical current. The workpiece stack-up 10 includes at least a first steel workpiece 14 and a second steel workpiece 16 that overlap at a weld site 18 where spot welding is intended to be practiced. The first and second steel workpieces 14, 16 respectively provide first and second sides 20, 22 of the workpiece stack-up 10 that are accessible by a set of axially aligned welding electrodes. And while only one weld site 18 is depicted in the Figures for sake of simplicity, skilled artisans will appreciate that spot welding may be practiced at multiple different weld sites on the same stack-up 10.

Referring now to FIG. 2, the workpiece stack-up 10 may include only the first and second steel workpieces 14, 16, as shown. When these two steel workpieces 14, 16 are stacked-up for spot welding, the first steel workpiece 14 includes a faying surface 24 and an exterior outer surface 26. Likewise, the second steel workpiece 16 includes a faying surface 28 and an exterior outer surface 30. The faying surfaces 24, 28 of the two steel workpieces 14, 16 overlap and contact one another to establish a faying interface 32 at the weld site 18. The faying interface 32, as that term is used herein, encompasses instances of direct contact between the faying surfaces 24, 28 of the workpieces 14, 16 as well as instances of indirect contact in which the faying surfaces 24, 28 are not touching but are in close enough proximity to each another—such as when a thin layer of adhesive, sealer, or some other intermediate material is present—that resistance spot welding can still be practiced. The exterior outer surfaces 26, 30 of the first and second steel workpieces 14, 16, on the other hand, generally face away from one another in opposite directions and constitute the first and second sides 20, 22 of the workpiece stack-up 10 at the weld site 18.

Each of the first and second steel workpieces 14, 16 includes a base steel substrate. The base steel substrate of at least one of the first or second steel workpieces 14, 16, or both, is a high-strength steel substrate having a tensile strength of 1000 MPa or greater. High-strength steels of this nature tend to be most susceptible to the formation of weld nuggets that include soft, coarse, and alloy deficient shell regions, which tend to be located at the nugget periphery, when spot welded according to conventional weld schedules, even when joined to other more weldable steel compositions. The high-strength steel substrate may also have a carbon content of 0.2 wt % or greater, which constitutes a particular class of high-strength steels that form relatively hard steel weld nuggets during spot welding. Additionally, the base steel substrate included in each of the first and second steel workpieces 14, 16 may be bare (uncoated) or coated with a thin layer of zinc, aluminum, or some other surface coating. Taking into account the thickness of the base steel substrate and any optional coating that may be present, each of the first and second steel workpieces 14, 16 has a thickness 140, 160 that ranges from 0.3 mm to 6.0 mm and, more specifically, from 0.5 mm to 3.0 mm, at least at the weld site 18.

The high-strength steel substrate that may be present in the first steel workpiece 14 and/or the second steel workpiece 16 may be composed of any of a variety of high-strength steel compositions. Some notable high-strength steels include dual-phase (DP) steel, complex-phase (CP) steel, martensitic (MART) steel, transformation-induced plasticity (TRIP) steel, twining-induced plasticity (TWIP) steel, and press-hardened steel (PHS). Moreover, in embodiments where only one of the first or second steel workpieces 14, 16 includes a high-strength steel substrate and the other does not, the workpiece that does not contain a high-strength steel substrate may include any other bare or coated (e.g., zinc or aluminum coated) steel substrate that is resistance spot weldable, such as those composed of mild steel, interstitial-free steel, bake-hardenable steel, high-strength low-alloy (HSLA) steel, or lower strength grades of DP, CP, TRIP, or TWIP steel, among others possible steel compositions.

The base steel substrates of the first and second steel workpieces 14, 16—whether a high-strength steel substrate or not—may be processed and shaped in any desirable manner. For instance, the base steel substrates may be in the form of pre-fabricated (e.g., stamped, drawn, punched, etc.) panels derived from hot-rolled or cold-rolled steel sheet metal or plate blanks, or pre-fabricated component parts derived from hot-rolled or cold-rolled steel blooms or billets. The base steel substrates may have also been heat-treated to obtain a particular set of mechanical properties. A few common heat-treating processes that may be practiced include annealing, quenching, and/or tempering, such as in the production of press-hardened steel. The term "substrate," as used herein, is thus meant to broadly encompass the many different types of production, processing, and shaping techniques that are available to prepare the base steel substrates for use in the first and second steel workpieces 14, 16 in advance of resistance spot welding.

Figure 3:
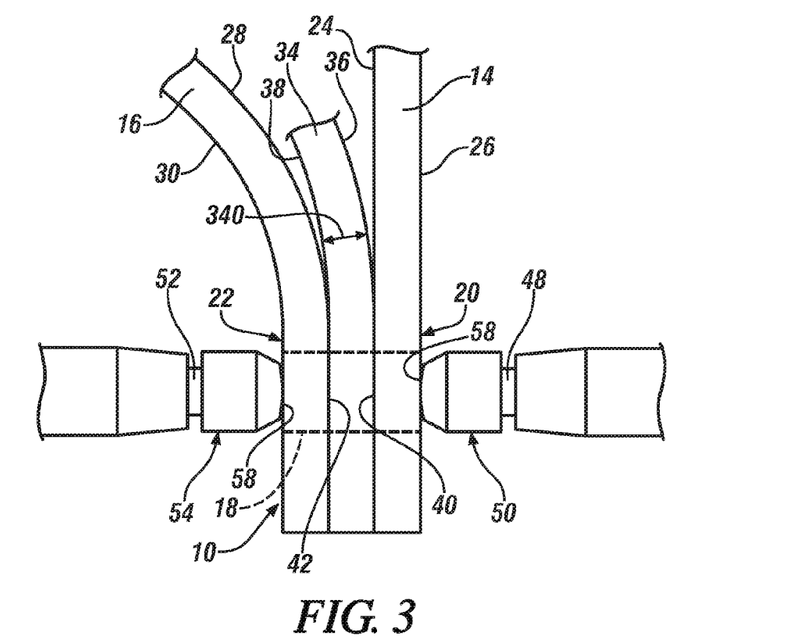
FIG. 3 is a magnified view of a workpiece stack-up with the welding electrodes carried by the weld gun shown in FIG. 1 engaged with opposite sides of the workpiece stack-up, although here the workpiece stack-up includes three overlapping steel workpieces instead of two.

Of course, as shown in FIG. 3, the workpiece stack-up 10 is not limited to the inclusion of only the first and second steel workpieces 14, 16. Indeed, as shown here, a third steel workpiece 34 may be included in the workpiece stack-up 10 between the first and second steel workpieces 14, 16. The third steel workpiece 34 is similar in many respects to the first and second steel workpieces 14, 16 in that it includes a base steel substrate, which may be bare or coated, and has a thickness 340 that lies within the same range recited above. The third steel workpieces 34 may also be processed and shaped in any suitable manner applicable to the first and second steel workpieces 14, 16 as previously discussed. When the workpiece stack-up 10 includes the first, second, and third steel workpieces 14, 16, 34, the base steel substrate of at least one of the first, second, or third steel workpieces 14, 16, 34 is a high-strength steel substrate having a tensile strength of 1000 MPa or greater and possibly a carbon content of 0.2 wt % or greater. In other words, one of the three steel workpieces 14, 16, 34, two of the three steel workpieces 14, 16, 34, or all three of the steel workpieces 14, 16, 34 may include a high-strength steel substrate.

As a result of stacking the first, second, and third steel workpieces 14, 16, 34 in overlapping fashion to assemble the workpiece stack-up 10, the third steel workpiece 34 has two faying surfaces 36, 38. One of the faying surfaces 36 overlaps and contacts the faying surface 24 of the first steel workpiece 14 and the other faying surface 38 overlaps and contacts the faying surface 28 of the second steel workpiece 16, thus establishing two faying interfaces 40, 42 within the workpiece stack-up 10 at the weld site 18. These two faying interfaces 40, 42 encompass the same type of direct or indirect contact between adjacent overlapping workpieces as previously discussed. Consequently, the exterior outer surfaces 26, 30 of the flanking first and second steel workpieces 14, 16 still generally face away from each other in opposite directions and constitute the first and second sides 20, 22 of the workpiece stack-up 10 at the weld site 18.

Returning now to the schematic illustration of FIG. 1, the weld gun 12 is shown as part of an automated welding operation within a manufacturing setting. The weld gun 12, for example, may be mounted on a robot positioned in the vicinity of a conveyor or other transport device that is set up to deliver the workpiece stack-up 10 (as well as others like it) to the weld gun 12. The robot may be constructed to move the weld gun 12 along the workpiece stack-up 10 so that a rapid succession of spot welds can be formed at different weld sites 18. The weld gun 12 may also be a stationary pedestal-type weld gun in which the workpiece stack-up 10 is manipulated and moved relative to the weld gun 12 to enable spot welding at different weld sites 18 around the stack-up 10. The weld gun 12 depicted in FIG. 1 is meant to be representative of a wide variety of weld guns, including c-type and x-type weld guns, as well as other weld gun types not specifically mentioned so long as they are capable of conducting resistance spot welding.

The weld gun 12 includes a first gun arm 44 and a second gun arm 46 that are mechanically and electrically configured to repeatedly form spot welds in accordance with the prescribed weld schedule. The first gun arm 44 is fitted with a first shank 48 that retains a first spot welding electrode 50, and the second gun arm 46 is fitted with a second shank 52 that retains a second spot welding electrode 54. The first and second spot welding electrodes 50, 54 are each preferably formed from an electrically conductive material such as copper alloy. One specific example is a zirconium copper alloy (ZrCu) that contains 0.10 wt % to 0.20 wt % zirconium and the balance copper. Copper alloys that meet this constituent composition and are designated C15000 are preferred. Other copper alloy compositions that possess suitable mechanical and electrical conductivity properties may also be employed. Additionally, as is well known in the art, a mechanism for supplying the first and second welding electrodes 50, 54 with cooling water is typically incorporated into the gun arms 44, 46 and the electrode shanks 48, 52 to keep the welding electrodes 50, 54 from overheating during spot welding.

Figure 4:
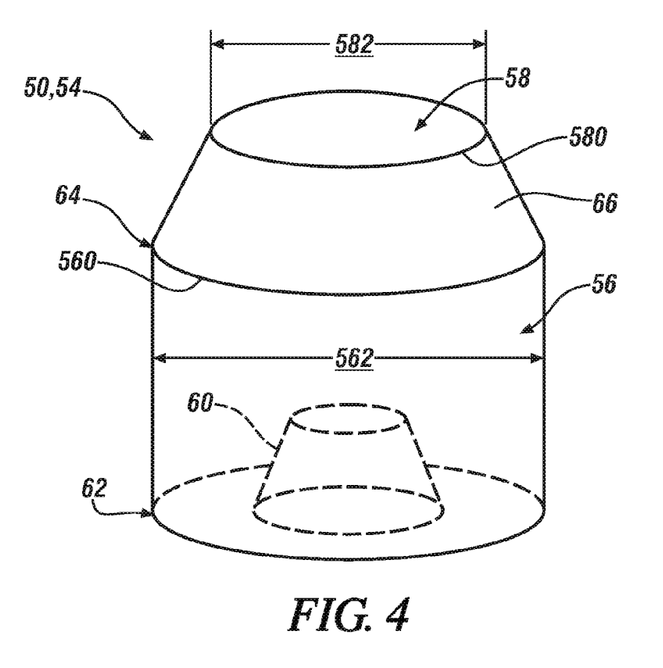
FIG. 4 generally illustrates a welding electrode that is pressed against the opposite sides of a workpiece stack-up to facilitate spot welding of the steel workpieces within the workpiece stack-up.

The first and second spot welding electrodes 50, 54 are generally constructed as depicted in FIG. 4. There, a welding electrode is shown that includes an electrode body 56 and a weld face 58. The electrode body 56 is cylindrical in shape and defines an accessible hollow recess 60 at a back end 62 for insertion of, and attachment with, an electrode shank (e.g., shank 48, 52). The other end of the electrode body 56, or front end 64, has a circumference 560 with a diameter 562 that preferably ranges from 10 mm to 22 mm or, more narrowly, from 13 mm to 20 mm. The weld face 58 is disposed on the front end 64 of the electrode body 56 and has a circumference 580 that is coincident with the circumference 560 of the body 56 (termed a "full face electrode") or is upwardly displaced from the circumference 560 of the body 56 by a transition nose 66 of frusto-conical or truncated spherical shape. If a transition nose 66 is present, the two circumferences 560, 580 may be parallel as shown here in FIG. 5 or they may be offset such that the circumference 580 of the weld face 58 is tilted relative to the circumference 560 of the front end 64 of the electrode body 56.

The weld face 58 is the portion of the welding electrodes 50, 54 that makes contact with, and is impressed either partially of fully into, the workpiece stack-up 10 during spot welding. That is, in practice, the weld faces 58 of the axially aligned first and second welding electrodes 50, 54 are pressed against and into the opposed first and second sides 20, 22 of the workpiece stack-up 10, which, here, are the exterior outer surfaces 26, 30 of the first and second steel workpieces 14, 16. The weld face 58 of each welding electrode 50, 54 may be flat, have a spherical dome shape with a radius of curvature of 15 mm to 150 mm ascending from the circumference 580 of the weld face 58, have a central projection such as a raised plateau or spherical ball-nose projection, or have concentric rings of ridges that project outwards from a base or nominal surface of the weld face as disclosed in U.S. Pat. Nos. 8,222,560; 8,436,269; 8,927,894; or in U.S. Pat. Pub. 2013/0200048, the foregoing documents being incorporated herein by reference in their entirety. In many applications, the weld face 58 has a diameter 582 measured at its circumference 580 that ranges from 4 mm to 12 mm and, more narrowly, from 5 mm to 10 mm.

Referring now specifically to FIGS. 1-2, the first and second gun arms 44, 46 of the weld gun 12 are operable during spot welding to converge and press the weld faces 58 of the first and second welding electrodes 50, 54 against the opposite first and second sides 20, 22 of the workpiece stack-up 10, respectively, which are provided by the oppositely-facing exterior surfaces 26, 30 of the overlapping first and second steel workpieces 14, 16. In this illustrated embodiment, for example, the first and second gun arms 44, 46 have approximately orthogonal longitudinal axes, and the first gun arm 44 is moveable along its longitudinal axis towards the stationary second gun arm 46 by an actuator 68 such as a servo motor. An actuator or gun control 70 causes current/voltage to be delivered to the actuator 68, if the actuator 68 is a servo motor, to move the first gun arm 44 so as to engage and press the weld faces 58 against the opposite sides 20, 22 of the workpiece stack-up 10 (surfaces 26, 30) and to apply the desired clamping force. The weld faces 58 of the first and second welding electrodes 50, 54 are pressed against their respective exterior outer workpiece surfaces 26, 30 in facial alignment with one another at the weld site 18.

The weld gun 12 is also configured to pass electrical current between the first and second spot welding electrodes 50, 54—and through the workpiece stack-up 10 at the weld site 18—when the weld faces 58 of the two electrodes 50, 54 are pressed against the opposite first and second sides 20, 22 of the stack-up 10. Electrical current is delivered, as a direct current (DC), to the weld gun 12 from a controllable power supply 72. The power supply 72 is preferably a medium-frequency direct current (MFDC) inverter power supply that electrically communicates with the first and second welding electrodes 50, 54, although other types of power supplies can certainly be used. A MFDC inverter power supply includes an inverter 720 and a MFDC transformer 722. The inverter 720 receives a three phase mains AC current (480V, 60 Hz in the U.S.). The mains AC current is first rectified and then inverted to produce a single phase input AC current, usually a square wave AC current, of higher voltage that is fed to the transformer 722, typically at 1000 Hz. The transformer 722 then "steps down" the input AC voltage to generate a lower-voltage, higher-amperage AC current which is then fed to the rectifier where a collection of semiconductor diodes converts the supplied AC current into a low-ripple DC current suitable for the present spot welding method. A MFDC inverter power supply 72 can be obtained commercially from a number of suppliers including Roman Manufacturing (Corporate headquarters in Grand Rapids, Mich.), ARO Welding Technologies (US headquarters in Chesterfield Township, Mich.), and Bosch Rexroth (US headquarters in Charlotte, N.C.).

A weld controller 74 controls the power supply 72 including the manner in which DC electrical current is delivered to the first and second welding electrodes 50, 54. Specifically, the weld controller 74 interfaces with the power supply 72 and allows a user to program a weld schedule that sets and dynamics of the DC electrical current being delivered to the welding electrodes 50, 54 over the course of a spot welding event. The weld schedule allows for customized control of the current level at any given time and the duration of current flow at any given current level, among others, and further allows for such attributes of the DC electrical current to be responsive to changes in very small time increments down to fractions of a millisecond. In this way, the weld controller 74 instructs the power supply 72 to deliver the DC electrical current to and between the first and second welding electrodes 50, 54 and through the workpiece stack-up 10 and across the faying interface 32 or interfaces 40, 42 at the weld site 18. Here, in the disclosed method, a pulsating DC electrical current is employed that delivers enough power over time to produce a weld nugget having a uniform hardness, as opposed to a weld nugget having soft shell regions, which will be further explained below.

Referring now to FIGS. 5-10, a spot welding method that employs an embodiment of the pulsating DC electrical current is illustrated in general schematic fashion. The workpiece stack-up 10 shown in these Figures is a two-workpiece stack-up that includes the first and second steel workpieces 14, 16 and a single faying interface 32. While a two-workpiece stack-up has been chosen to demonstrate the spot welding method, skilled artisans will know and appreciate that the spot welding method can also be practiced with a three-workpiece stack up like the one depicted in FIG. 3. And, as described above, a three-workpiece stack-up includes two faying interfaces 40, 42 within the stack-up at the weld site 18, as opposed to the single faying interface 32 present in the two-workpiece stack-up shown in FIG. 2. Each of the two faying interfaces 40, 42 in a three-workpiece stack-up will experience initiation, growth, and solidification of a molten steel weld pool in much the same way as described below in the context of a two-workpiece stack-up. A separate discussion of the spot welding method with reference to Figures that illustrate a three-workpiece stack-up is thus not necessary here.

Figure 5:
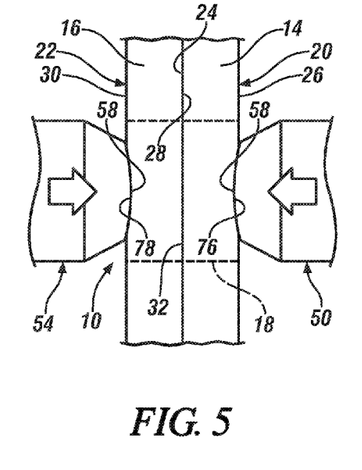
FIG. 5 generally illustrates a pair of welding electrodes pressed against opposite sides of a workpiece stack-up (shown in cross-section) prior to initiation and growth of a molten steel weld pool at the faying interface.

At the onset of the spot welding method, the workpiece stack-up 10 is located between the first and second welding electrodes 50, 54 so that the weld site 18 is between the axially-facially-aligned weld faces 58 of the two electrodes 50, 54, as shown in FIG. 5. The workpiece stack-up 10 may be brought to such a location, as is often the case when the gun arms 44, 46 are part of a stationary pedestal welder, or the gun arms 44, 46 may be robotically moved to locate the electrodes 50, 54 relative to the weld site 18. Once the workpiece stack-up 10 is properly located, the weld gun 12 is operated to converge the first and second welding electrodes 50, 54 relative to one another so that their respective weld faces 58 make contact with, and press against, the opposite first and second sides 20, 22 of the stack-up 10 at the weld site 18, which, here, are the oppositely-facing exterior surfaces 26, 30 of the first and second steel workpieces 14, 16. The convergence of the first and second welding electrodes 50, 54 is achieved in this particular embodiment by causing the actuator 68 (via the actuator or gun control 70) to move the first gun arm 44 forward along its longitudinal axis towards the stationary second gun arm 46.

The weld faces 58 of the first and second welding electrodes 50, 54 are pressed against their respective exterior outer workpiece surfaces 26, 30 in alignment with one another at the weld site 18 under a clamping force that ranges, for example, between 200 lb and 2000 lb or more narrowly from 400 lb to 1400 lb. This clamping force is sufficient to impress the weld faces 58 of the first and second welding electrodes 50, 54 into their respective first and second sides 20, 22 of the stack-up 10 (surfaces 26, 30) to establish a first contact patch 76 (on the first side 20) and a second contact patch 78 (on the second side 22). Because the first and second contact patches 76, 78 are relatively small prior to current flow, only a portion of the weld faces 58 of the first and second welding electrodes 50, 54 are in direct indented contact with the exterior surfaces 26, 30 of the first and second steel workpieces 14, 16 at this time.

Figure 6:
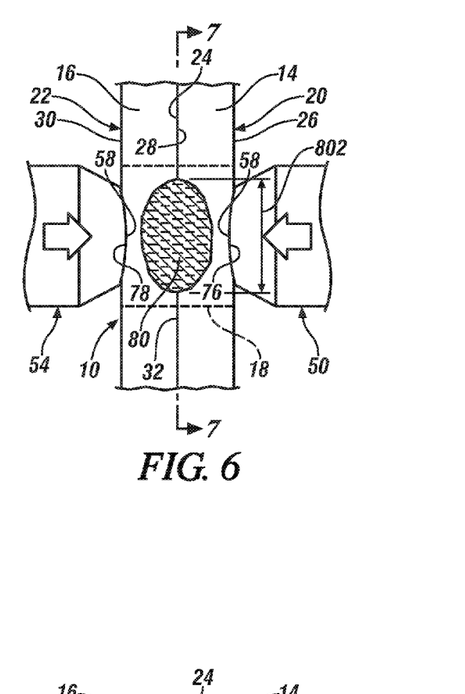
FIG. 6 generally illustrates a pair of welding electrodes pressed against opposite sides of a workpiece stack-up (shown in cross-section) and passing electrical current therebetween so as to initiate and grow a molten steel weld pool (also shown in cross-section) at the faying interface of the stack-up.
Figure 7:
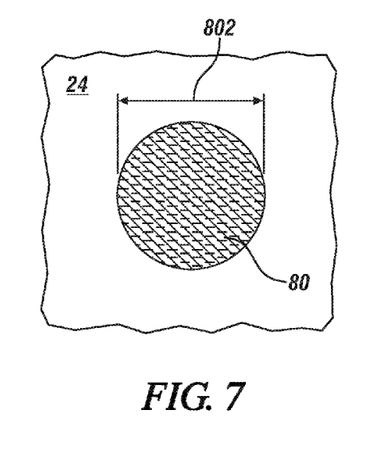
FIG. 7 is a plan view of the molten steel weld pool shown in FIG. 6, taken along line 7-7, depicting the maximum diameter of the weld pool at the original location of the faying interface.

After the welding electrodes 50, 54 are engaged with the exterior surfaces 26, 30 of their respective steel workpieces 14, 16, the pulsating DC electrical current is passed between the confronting and facially aligned weld faces 58 of the first and second welding electrodes 50, 54. The passage of the pulsating DC electrical current initiates and grows a molten steel weld pool 80 at the faying interface 32, as shown in FIG. 6. The molten steel weld pool 80 is grown to a maximum diameter 802, which is measured at the location of the original faying interface 32 where the weld pool is initiated, as shown in FIGS. 6-7. The maximum diameter 802 attained by the molten steel weld pool is typically sized between 4 mm and 9 mm. Also, in addition to growing in the diameter direction, the molten steel weld pool 80 grows and penetrates into each of the adjacent steel workpieces 14, 16 from their original faying surfaces 24, 28. Within each of the steel workpieces 14, 16, the molten steel weld pool 80 penetrates to a distance that typically ranges from 20% to 90%, and more narrowly from 40% to 80%, of the thicknesses 140, 160 of the steel workpieces 14, 16 at the weld site 18.

The molten steel weld pool 80 is rapidly quenched and begins to solidify when passage of the pulsating DC electrical current ceases and the heat contained in the weld pool 80 dissipates into the surrounding steel and the first and second welding electrodes 50, 54. The first and second welding electrodes 50, 54 continue to maintain their clamping force against the opposite first and second sides 20, 22 of the workpiece stack-up 10 during solidification of the molten steel weld pool 80. The contact patches 76, 78 formed in the exterior surfaces 26, 30 of the steel workpieces 14, 16 are therefore larger at the time current is ceased compared to the time when current is commenced due to the continued indentation of the weld faces 58 as the workpieces 14, 16 soften at the weld site 18 over the course of current flow. For instance, from the time current flow is commenced to the time current flow is ceased, the contact patches 76, 78 may increase in surface area by as much as a multiple of four to nine, which, as will be further explained below, is countered by the pulsating DC electrical current so that the growing contact patches 76, 78 do not lead to premature and slow solidification of the molten steel weld pool 80 into soft shell regions.

Figure 8:
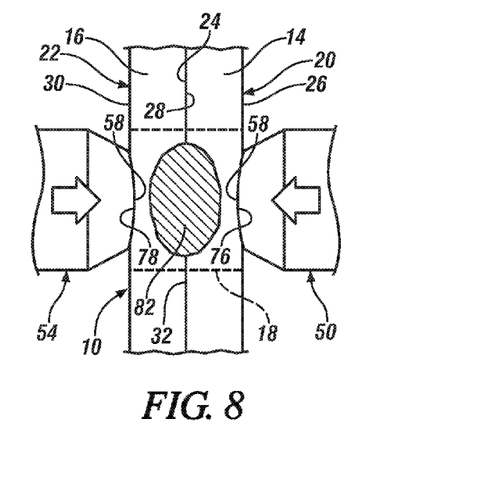
FIG. 8 generally illustrates a pair of welding electrodes pressed against opposite sides of a workpiece stack-up (shown in cross-section) after cessation of electrical current flow and solidification of a molten steel weld pool into a weld nugget (also shown in cross-section) at the faying interface of the stack-up.
Figure 9:
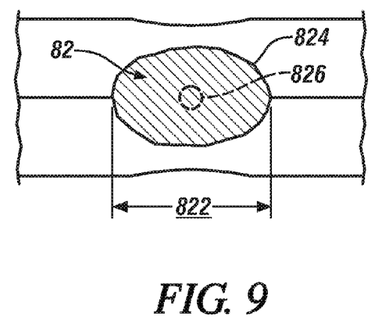
FIG. 9 generally illustrates the weld nugget of FIG. 8 and shows the center of the weld nugget in relation to the outer boundary of the weld nugget.
Figure 10:
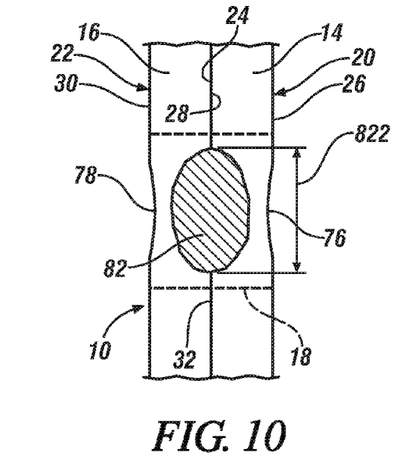
FIG. 10 generally illustrates a workpiece stack-up after a weld nugget (shown in cross-section) has been formed and the welding electrodes have been removed from their respective sides of the stack-up.

The molten steel weld pool 80 solidifies inward from its maximum diameter 802 to form a weld nugget 82, as shown in FIGS. 7-8. The weld nugget 82 has a diameter 822 (FIGS. 9-10), which is also measured at the location of the original faying interface 32 where the molten steel weld pool 80 is initiated, equal to the maximum diameter 802 attained by the molten steel weld pool 80. The two diameters 802, 822 are the same since the size and shape of the pre-existing molten steel weld pool 80 establishes the size and shape of the weld nugget 82 derived therefrom. Once it has become fully solidified, the weld nugget 82 fuses the steel workpieces 14, 16 together at the weld site 18. The welding electrodes 50, 54 are then separated from their respective contact patches 76, 78, as shown in FIG. 10, and the workpiece stack-up 10 is re-located relative to the weld gun 12 to position the first and second welding electrodes 50, 54 at another weld site 18 where the spot welding process is repeated, or the stack-up 10 is moved away from the weld gun 12 to make room for another stack-up 10.

The weld nugget 82 that results from passage of the pulsating DC electrical current has a uniform hardness. That is, with reference to FIG. 9, the hardness of any location within the outer boundary 824 of the weld nugget 82—the outer boundary being defined by the fusion line of the weld nugget 82 that separates the solidified nugget material from the surrounding heat-affected zone—does not vary by more than 10%, and preferably does not vary by more than 5%, from the hardness of the center 826 of the weld nugget 82, as measured by Vickers hardness. To be sure, for a high-strength steel that contains at least 0.2 wt % carbon, the Vickers hardness of the center 826 of the weld nugget 82 is typically in the range of 500 HV to 600 HV, or more narrowly in the range of 520 HV to 580 HV, meaning that the Vickers hardness of any other location within the outer boundary 824 of the weld nugget 82 would have a Vickers Hardness of no more than 50 HV (based on 500 HV) to 60 HV (based on 600 HV) less than that of the weld nugget center 826. The Vickers hardness values of the weld nugget 82 can be determined by sectioning the steel weld nugget 82 and following the standard procedure set forth ASTM E384-11 ("Standard Test Method for Knoop and Vickers Hardness of Materials"). When following the standard procedure, an indentation is made in the sectioned weld nugget with a square-based pyramidal diamond indenter using an applied force of 500 gf. The applied force is then divided by the surface area of the permanent indention made by the indenter to calculate the Vickers hardness value.

The pulsating DC electrical current delivers sufficient power through the weld site 18—by way of electrical current pulses—to produce the weld nugget 82 with its uniform hardness despite that fact that the weld faces 58 of the first and second welding electrodes 50, 54 impress deeper into their respective exterior outer workpiece surfaces 26, 30 (and thus increase the surface area of the contact patches 76, 78) over the course of current flow as the steel workpieces 14, 16 heat up and soften. A preferred way to attain such a weld nugget 82 involves progressing the pulsating DC electrical current through two consecutive stages: (1) a conditioning stage and (2) a weld pool sizing stage. The conditioning stage heats the faying interface 32 and the electrode/workpiece junctions formed between the weld faces 58 of the welding electrodes 50, 54 and their respective workpiece exterior outer surfaces 26, 30 without initiating melting of the first and second steel workpieces 14, 16 at the faying interface 32. The sizing stage, which follows the conditioning stage, includes a plurality of electrical current pulses that grow the molten steel weld pool 80 at the faying interface 32 so that the weld pool 80 can be rapidly quenched into the weld nugget 82 of uniform hardness.

Figure 11:
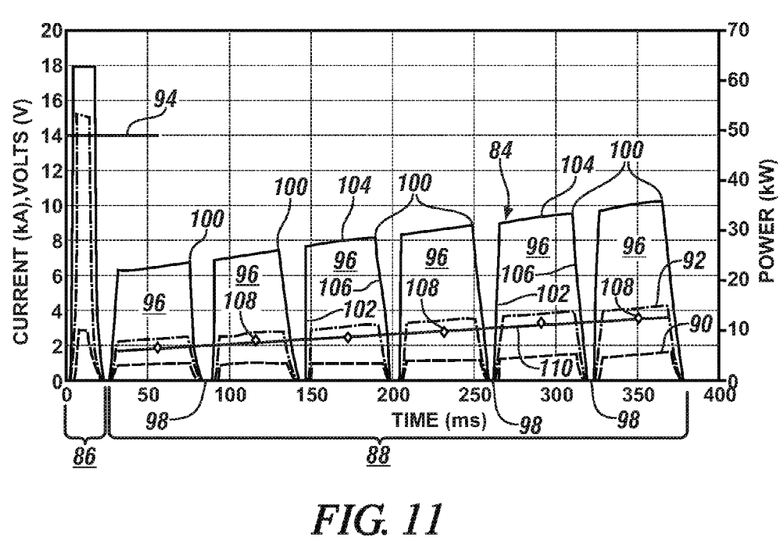
FIG. 11 is a general graphical depiction of a pulsating DC electrical current that is passed between the welding electrodes in order to conduct spot welding of the steel workpieces as depicted in FIGS. 5-10. Plotted in the graph of FIG. 11 is the electrical current level of the pulsating DC electrical current along with the voltage established between the welding electrodes and the power delivered by the current. Additionally, FIG. 11 includes a regression line that results from subjecting the average applied powers of the several electrical current pulses of the pulsating DC electrical current to simple linear regression.

Referring now to FIG. 11, a weld schedule is shown that sets forth a generalized and representative graphical depiction of the pulsating DC electrical current. Here, the pulsating DC electrical current has a current level 84 whose magnitude, duration, duty cycle, etc. are directly controllable by the weld controller 74 as instructed. The current level 84 of the pulsating DC electrical current is plotted in kiloamperes (kA) as a function of time in milliseconds (ms) and can be subdivided into a conditioning stage 86 and a weld pool sizing stage 88. Furthermore, in addition to plotting the current level 84 of the pulsating DC electrical current through the conditioning and sizing stages 86, 88, the weld schedule shown in FIG. 11 also plots the voltage 90 (in volts, V) between the first and second welding electrodes 50, 54 and the power 92 (in kilowatts, kW) being delivered by the pulsating DC electrical current.

The conditioning stage 86 is commenced once the first and second welding electrodes 50, 54 are pressed against their respective exterior outer workpiece surfaces 26, 30 at the weld site 18. At the start of this stage 86, the current level 84 of the pulsating DC electrical current is increased abruptly from 0 kA to above a conditioning current threshold limit 94 for a period of time sufficient to heat the faying interface 32 and the first and second welding electrodes 50, 54 at their interfaces with the exterior outer workpiece surfaces 26, 30, respectively, without initiating melting of the steel workpieces 14, 16 at the faying interface 32. As these various interfaces are heated, it is believed that the total electrical interface resistance affecting current flow between the welding electrodes 50, 54 is broken down and reduced. Eventually, to conclude the conditioning stage 86, the current level 84 of the pulsating DC electrical current is reduced to below the conditioning current threshold limit 94—the current level 84 preferably being programmed to be reduced to 0 kA—for a period of time to cool the various heated interfaces in preparation for the following sizing stage 88.

The value of the conditioning current threshold limit 94 and the period of time the current level 84 of the pulsating DC electrical current is maintained above that limit 94 can vary depending on the construction of the workpiece stack-up 10 (two-stack or three-stack) and the composition and thicknesses of its overlapping steel workpieces 14, 16 (and possibly 34). In many instances, however, the conditioning current threshold limit 94 is 12 kA or, more preferably, 15 kA, meaning that, during the conditioning stage 86, the current level 84 of the pulsating DC electrical current is raised to above such a threshold limit, while typically being kept below 22 kA, for a period of time sufficient to achieve the requisite preheating. The time period at which the current level 84 of the pulsating DC electrical current is maintained above the conditioning current threshold limit 94 is also subject to some variability, but typically ranges from 5 ms to 25 ms or, more narrowly, from 10 ms to 18 ms.

At the end of the conditioning stage 86, which occurs after the pulsating DC electrical current has been maintained above the conditioning current threshold limit 94 for the requisite period of time, the current level 84 of the pulsating DC electrical current is reduced to below the conditioning current threshold limit 94 for a period of time to cool the various heated interfaces, as stated above. And, like before, the extent to which the current level 84 of the pulsating DC electrical current is reduced and the amount of time the current level 84 is kept in a reduced state can vary depending on the construction of the workpiece stack-up 10 (two-stack or three-stack) and the composition and thicknesses of its overlapping steel workpieces 14, 16 (and possibly 34). For instance, it is usually sufficient to reduce the current level 84 of the pulsating DC electrical current to 1 kA or less. Indeed, in a preferred embodiment, the current level 84 of the pulsating DC electrical current is programmed to be reduced to 0 kA, although in such instances inductive effects will likely keep a small amount current flowing at a current level of slightly greater than 0 kA. The time period at which the current level 84 is maintained in a reduced state is, again, subject to some variability, but typically ranges from 5 ms to 20 ms or more narrowly from 8 ms to 15 ms.

The sizing stage 88 is carried out after the conditioning stage 86 is completed. In the sizing stage 88, the pulsating DC electrical current 100 initiates and grows the molten steel weld nugget 80 to its maximum diameter 802 in the low-resistance setting established in the conditioning stage 86. This portion of the pulsating DC electrical current includes a plurality of electrical current pulses 96—usually in the range of three to fifteen—that are separated from one another by intermittent cooling periods 98 of reduced current level. Each of the electrical current pulses 96 includes a peak current level 100 that is below the conditioning current threshold limit 94 and may exhibit a variety of current level profiles. For example, as shown in FIG. 11, each of the electrical current pulses 96 may include a ramping leg 102, a bridge leg 104, and a decay leg 106. The ramping leg 102 is the current level ascension at the beginning of the pulse 96, the decay leg 106 is the current level descent at the end of the pulse 96, and the bridge leg 104 is the portion of the pulse 96 that connects the ramping leg 102 and the decay leg 106. The intermittent cooling periods 98 that separate these electrical current pulses 96 are instituted between the decay leg 106 of any one current pulse 96 and the ramping leg 102 of the immediately succeeding current pulse 96.

The peak current level 100 of each electrical current pulse 96 may be present anywhere on the bridge leg 104 including the point at which the ramping leg 102 transitions to the bridge leg 104 or the point at which the bridge leg 104 transitions to the decay leg 106. In one embodiment, for instance, the bridge leg 104 may have a positive upward slope that, as shown here in FIG. 11, rises with time from the ramping leg 102 to the decay leg 106 and joins with the decay leg 106 at the peak current level 100 of the pulse 96. In another alternative embodiment, however, the bridge leg 104 may have a constant current level, i.e., a slope of 0, such that the bridge leg 104 remains constant at the peak current level 100 of the pulse 96 while joining the ramping leg 102 and the decay leg 106. Others locations of the peak current level 100 are or course possible such as on a current level spike in the bridge leg 104, to name but another possibility.

In a preferred application of the sizing stage 88, the plurality of electrical current pulses 96 included in the pulsating DC electrical current following the conditioning stage 86 have bridge legs 104 that last for a period of 30 ms to 70 ms, or more narrowly for a period of 40 ms to 60 ms, and have peak current levels 100 within the bridge legs 104 that lie between 5 kA and 15 kA, or more narrowly between 6 kA and 12 kA. Moreover, during the intermittent cooling periods 98 between the electrical current pulses 96, the current level 84 of the pulsating DC electrical current is preferably reduced to 1 kA or less for a period of 5 ms to 25 ms, or more narrowly for a period of 7 ms to 15 ms. Specifically, the pulsating DC electrical current may programmed to be reduced to 0 kA during the intermittent cooling periods 98, although in such instances inductive effects will likely keep a small amount current flowing at a current level of slightly greater than 0 kA.

Regardless of their particular current level profiles, each of the electrical current pulses 96 delivers power through the weld site 18, considering electrical power (in Watts) is the product of current level (in Amperes) and voltage (in Volts). The power delivered by the electrical current pulses 96 over time during the course of the sizing stage 88 is adapted to ensure the pulsating DC electrical current can grow the molten steel weld pool 80 up to its maximum diameter 802 despite the reduction in current density that results from the continued impression of the electrode weld faces 58 into their respective exterior outer workpiece surfaces 26, 30. Essentially, the electrical current pulses 96 deliver a series of consecutive power surges that avoids the type of reduction in power delivery encountered when using conventional weld schedules that call for current to be passed for an extended period at a constant level. By consistently growing the molten steel weld pool 80 to its maximum diameter 802, and then rapidly quenching and solidifying the weld pool 80 from its maximum diameter 802 inwards in all directions, the resultant weld nugget 82 attains its uniform hardness, as described above, and thus does not include soft, coarse, and alloy deficient shell regions that can have an adverse impact on the strength—most notably the peel strength—of the weld nugget 82.

The power delivered by the pulsating DC electrical current is sufficient to attain the weld nugget 82 of a uniform hardness when an average applied power 108 is calculated for each electrical current pulse 96 in the sizing stage 88 and a simple linear regression analysis performed on the average applied powers 108 results in a regression line 110 (depicted here having a positive slope) having a slope of −1.0 kW/100 ms or greater (i.e., more positive). The "average applied power" 108 of each electrical current pulse 96, which is tagged at the midpoint of the pulse 96, is the arithmetic mean of the power delivered by the pulse 96 from the start of the ramping leg 102 to the end of the decay leg 106. "Simple linear regression" is a statistical modeling approach that fits a straight regression line through a set of data points—here, the average applied powers 108 of the electrical current pulses 96 in the sizing stage 88 of the pulsating DC electrical current—based on the ordinary least squares method. The ordinary least squares method fits the straight regression line through the data points such that the sum of the squared residuals (i.e., the sum of the vertical distances between the data points and the regression line) is minimized. The regression line and its corresponding equation can be determined using conventional and widely-available modeling or spreadsheet software.

The average applied powers 108 of the electrical current pulses 96 in the sizing stage 88 can produce a regression line 110 having a slope of −1.0 kW/100 ms or greater in many ways. For example, as shown here in FIG. 11, the bridge leg 104 of each of the electrical current pulses 96 lasts for approximately the same time period, e.g., about 50 ms, and the peak current level 100 of each electrical current pulse 96 is greater than the peak current level 100 of its immediately preceding pulse 96 such that a regression line 110 having a positive slope (i.e., a slope of greater than 0 kA/100 ms) results from subjecting the average applied powers 108 to simple linear regression. This is true even if an interfacial expulsion event occurs during any of the electrical current pulses 96 to thereby momentarily reduce the power being delivered by that particular electrical current pulse 96. In other embodiments, the bridge leg 104 of each of the electrical current pulses 96 again lasts for approximately the same time period, e.g., about 50 ms, and the peak current levels 100 of the electrical current pulses 96 are approximately the same such that a regression line 110 having a slightly positive to a slightly negative slope results from subjecting the average applied powers 108 to simple linear regression.

The fact that a regression line 110 having a slope of −1.0 kW/100 ms or greater can be obtained from the average applied powers 108 signifies that enough power is being delivered over the course of the sizing stage 88 to offset the increasing cross-sectional area of current flow between the first and second welding electrodes 50, 54 that accompanies the growing contact patches 76, 78. Indeed, the first and second contact patches 76, 78 formed between the weld faces 58 of the first and second welding electrodes 50, 54 and the exterior outer surfaces 26, 30 of the first and second steel workpieces 14, 16 are relatively small in diameter and shallow in depth at the beginning of the sizing stage 88. But as the sizing stage 88 proceeds, during which the steel workpieces 14, 16 are heated at the weld site 18 and the molten steel weld pool 80 is created, the electrode weld faces 58 impress further into their respective exterior outer workpiece surfaces 26, 30. Such continued impression of the weld faces 58 increases the contact area between the weld faces 58 and the exterior outer workpiece surfaces 26, 30 on each side 20, 22 of the workpiece stack-up 10, which increases the cross-sectional area of current flow through the weld site 18. The pulsating DC electrical current 84 functions in this environment to avoid the substantial reduction in current density and corresponding drop in power delivery that typifies conventional weld schedules that call for current to be passed at a constant current level.

EXAMPLES

The following examples set forth several specific implementations of the present steel spot welding method as applied to different workpiece stack-ups comprised of two or three overlapping steel workpieces. The workpiece stack-ups included different combinations of steel workpieces having different thicknesses and were thus spot welded in accordance with a weld schedule programmed to execute a version of the pulsating DC electrical current suited for the particular stack-up being welded. Each example was carried out using overlapping stacked coupons of the recited steel compositions on a laboratory spot welding gun. The executed pulsating DC electrical current for each example included a conditioning stage and a sizing stage of the type and character described above. Here, in each example, the current level of the pulsating DC electrical current is plotted in kiloamperes (kA) versus time and is identified by reference numeral 500. Moreover, in addition to plotting the level of DC electrical current flow, each example also plots the voltage 510 between the electrodes in volts (V) and the power 512 being delivered by the pulsating DC electrical current in kilowatts (kW). Still further, a regression line that results from subjecting the average applied power of each electrical current pulse in the sizing stage to simple linear regression is identified with reference numeral 520.

Example 1

Figure 12:
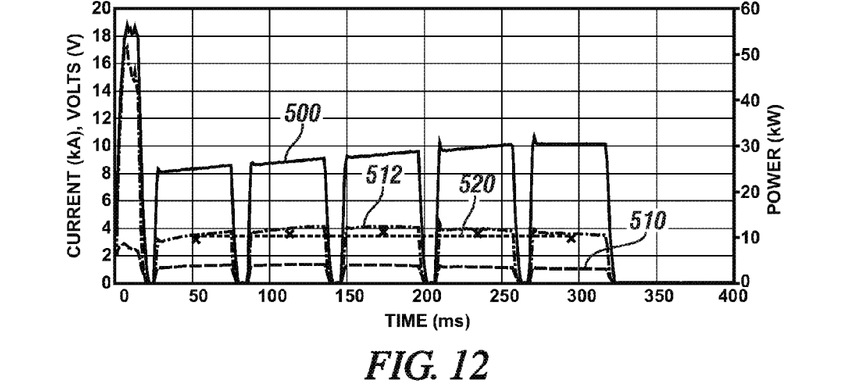
FIG. 12 is a graphical depiction of the pulsating DC electrical current, which includes a conditioning stage and a sizing stage, according to one embodiment of the disclosure.

In this example, which corresponds to FIG. 12, a 1.5-mm thick high-strength, uncoated PHS (1300 MPa) workpiece was resistance spot welded to a 1.5-mm thick uncoated Dual Phase steel (590 MPa) workpiece. The two workpieces were held together by DOW Betamate 1486 adhesive. During the conditioning stage of the pulsating DC electrical current, the current level was raised to 18 kA for a period of 15 ms, followed by a 10 ms cooling period (current level programmed to 0 kA). Next, during the sizing stage, the pulsating DC electrical current was programmed to include five electrical current pulses that were separated from one another by intermittent cooling periods (where the current level of the pulsating DC electrical current was programmed to 0 kA) of 10 ms. The five electrical current pulses lasted for 50 ms each.

Of the five electrical current pulses included in the sizing stage, the first four had peak current levels falling within the range of about 8-10 kA, and the peak current level of each of those pulses was greater than the peak current level of each of its preceding pulses. The fifth electrical current pulse was kept constant at 10 kA and also lasted for 50 ms. When the average applied power (identified with an "x" symbol) of each electrical current pulse in the sizing stage was subjected to simple linear regression, the resultant regression line 520 had a slope greater than zero and was represented by the equation y=0.0009t+10.287, where (y) is the power in kW and (t) is the time in milliseconds (ms). The regression line 520 thus had a slope of 0.09 kW/100 ms.

Example 2

Figure 13:
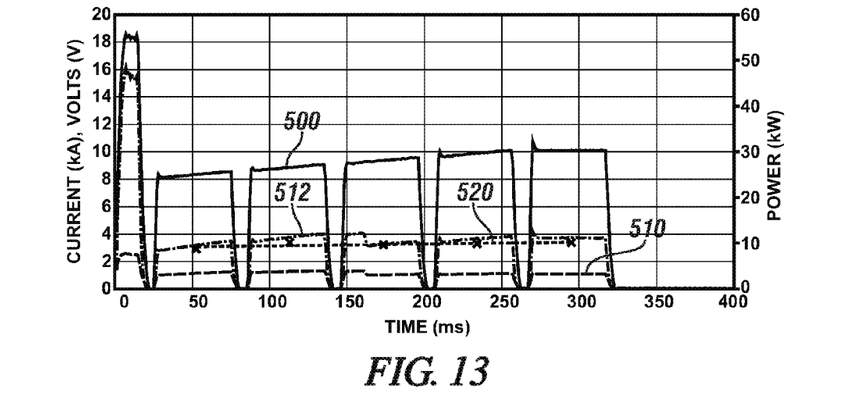
FIG. 13 is a graphical depiction of the pulsating DC electrical current, which includes a conditioning stage and a sizing stage, according to another embodiment of the disclosure.

In this example, which corresponds to FIG. 13, a 1.5-mm thick high-strength, uncoated PHS (1300 MPa) workpiece was resistance spot welded to another 1.5-mm thick uncoated Dual Phase steel (590 MPa) workpiece in the same manner set forth above with respect to example 1 including the use of DOW Betamate 1486 adhesive to hold the workpieces together. One difference in this example, however, is that an internal expulsion event occurred at the faying interface during the third electrical current pulse in the sizing stage of the pulsating DC electrical current. The fact that this expulsion event occurred was not out of the ordinary and its effects on the relevant properties of the final weld nugget were not seen as detrimental. When the average applied power (identified with an "x" symbol) of each electrical current pulse in the sizing stage was subjected to simple linear regression, the resultant regression line 520 had a slope greater than zero and was represented by the equation y=0.0041t+9.0391, where (y) is the power in kW and (t) is the time in milliseconds (ms). The regression line 520 thus had a slope of 0.41 kW/100 ms.

Example 3

Figure 14:
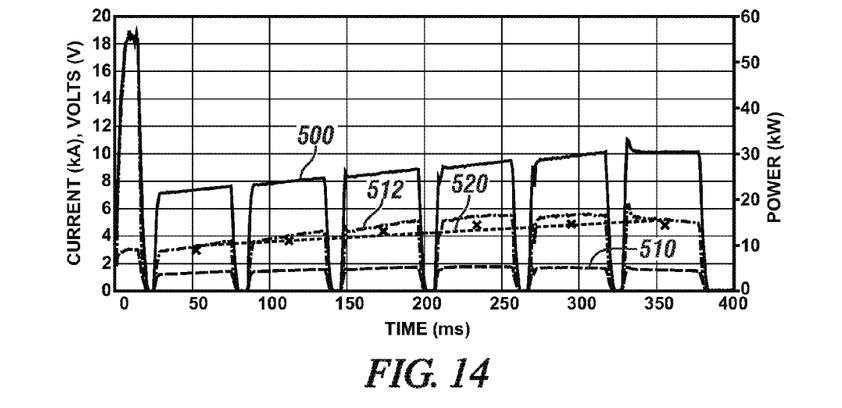
FIG. 14 is a graphical depiction of the pulsating DC electrical current, which includes a conditioning stage and a sizing stage, according to still another embodiment of the disclosure.

In this example, which corresponds to FIG. 14, a 1.5-mm thick high-strength, uncoated PHS (1300 MPa) workpiece, a 1.5-mm thick uncoated Dual Phase steel (590 MPa) workpiece, and a 1.6-mm thick uncoated HSLA steel (340 MPa) workpiece were resistance spot welded together. The two adjacent 1.5-mm thick workpieces were held together by DOW Betamate 1486 adhesive. During the conditioning stage of the pulsating DC electrical current, the current level was raised to 18 kA for a period of 15 ms, followed by a 10 ms cooling period (current level programmed to 0 kA). Next, during the sizing stage, the pulsating DC electrical current was programmed to include six electrical current pulses that were separated from one another by intermittent cooling periods (where the current level of the pulsating DC electrical current was programmed to 0 kA) lasting for 10 ms. The six electrical current pulses lasted for 50 ms each.

Of the six electrical current pulses included in the sizing stage, the first five had peak current levels falling within the range of about 7-10 kA, and the peak current level of each of those pulses was greater than the peak current level of each of its preceding pulses. The sixth electrical current pulse was kept constant at 10 kA and also lasted for 50 ms. When the average applied power (identified with an "x" symbol) of each electrical current pulse in the sizing stage was subjected to simple linear regression, the resultant regression line 520 had a slope greater than zero and was represented by the equation $y=0.0186t+8.9261$, where (y) is the power in kW and (t) is the time in milliseconds (ms). The regression line 520 thus had a slope of 1.86 kW/100 ms.

Example 4

Figure 15:
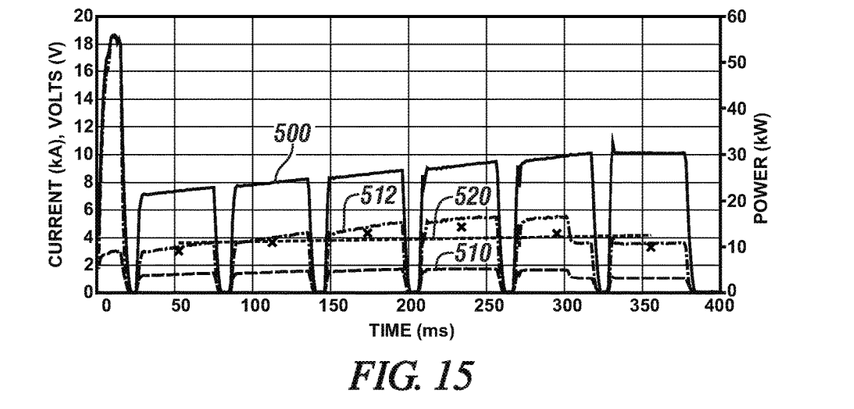
FIG. 15 is a graphical depiction of the pulsating DC electrical current, which includes a conditioning stage and a sizing stage, according to yet another embodiment of the disclosure.

In this example, which corresponds to FIG. 15, a 1.5-mm thick high-strength, uncoated PHS (1300 MPa) workpiece, a 1.5-mm thick uncoated Dual Phase steel (590 MPa) workpiece, and a 1.6-mm thick uncoated HSLA steel (340 MPa) workpiece were resistance spot welded together in the same manner set forth above with respect to example 3 including the use of DOW Betamate 1486 adhesive to hold the two 1.5-mm thick workpieces together. One difference in this example, however, is that an internal expulsion event occurred at the faying interface during the fifth electrical current pulse in the sizing stage of the pulsating DC electrical current. The fact that this expulsion event occurred was not out of the ordinary and its effects on the relevant properties of the final weld nugget were not seen as detrimental. When the average applied power (identified with an "x" symbol) of each electrical current pulse in the sizing stage was subjected to simple linear regression, the resultant regression line 520 had a slope greater than zero and was represented by the equation $y=0.0054t+10.605$, where (y) is the power in kW and (t) is the time in milliseconds (ms). The regression line 520 thus had a slope of 0.54 kW/100 ms.

Example 5

Figure 16:
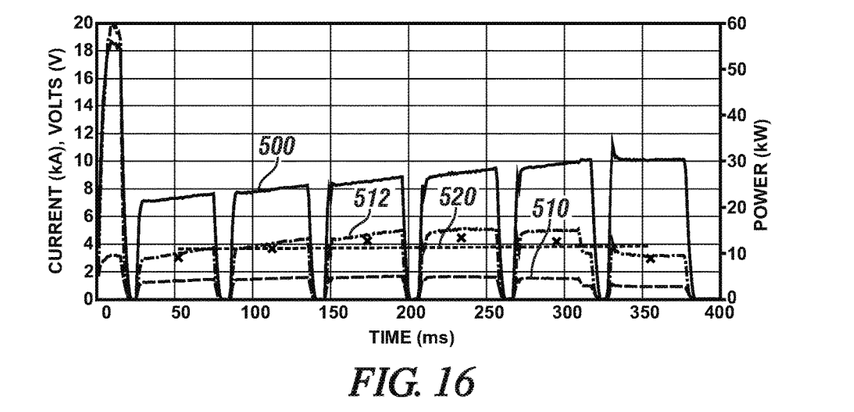
FIG. 16 is a graphical depiction of the pulsating DC electrical current, which includes a conditioning stage and a sizing stage, according to still another embodiment of the disclosure.

In this example, which corresponds to FIG. 16, a 1.5-mm thick high-strength, uncoated PHS (1300 MPa) workpiece, a 1.5-mm thick uncoated Dual Phase steel (590 MPa) workpiece, and a 1.1-mm thick uncoated Dual Phase (590 MPa) workpiece were resistance spot welded together. The two adjacent 1.5-mm thick workpieces were held together by DOW Betamate 1486 adhesive. During the conditioning stage of the pulsating DC electrical current, the current level was raised to 18 kA for a period of 15 ms, followed by a 10 ms cooling period (current level programmed to 0 kA). Next, during the sizing stage, the pulsating DC electrical current was programmed to include six electrical current pulses that were separated from one another by intermittent cooling periods (where the current level of the pulsating DC electrical current was programmed to 0 kA) lasting for 10 ms. The six electrical current pulses lasted for 50 ms each.

Of the six electrical current pulses included in the sizing stage, the first five had peak current levels falling within the range of about 7-10 kA, and the peak current level of each of those pulses was greater than the peak current level of each of its preceding pulses. The sixth electrical current pulse was kept constant at 10 kA and also lasted for 50 ms. When the average applied power (identified with an "x" symbol) of each electrical current pulse in the sizing stage was subjected to simple linear regression, the resultant regression line 520 had a slope greater than zero and was represented by the equation $y=0.0019t+10.897$, where (y) is the power in kW and (t) is the time in milliseconds (ms). The regression line 520 thus had a slope of 0.19 kW/100 ms.

Example 6

Figure 17:
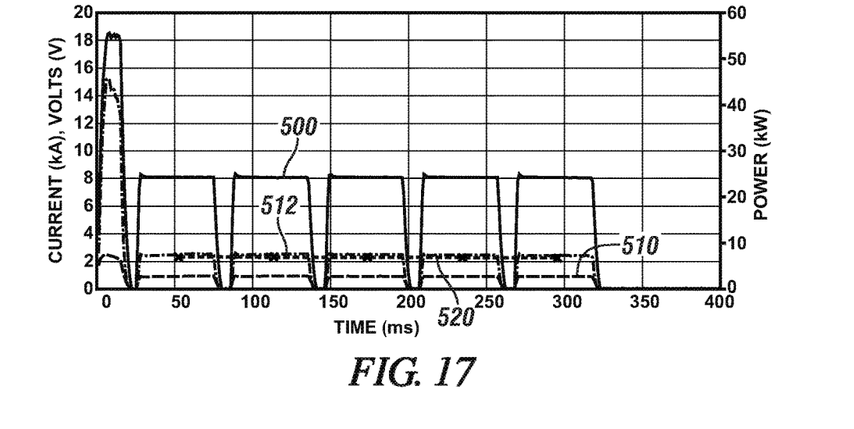
FIG. 17 is a graphical depiction of the pulsating DC electrical current, which includes a conditioning stage and a sizing stage, according to yet another embodiment of the disclosure.

In this example, which corresponds to FIG. 17, a 1.0-mm thick high-strength, uncoated PHS (1300 MPa) workpiece was resistance spot welded to a 1.1-mm thick uncoated Dual Phase steel (590 MPa) workpiece. The two workpieces were held together by DOW Betamate 1486 adhesive. During the conditioning stage of the pulsating DC electrical current, the current level was raised to 18 kA for a period of 15 ms, followed by a 10 ms cooling period (current level programmed to 0 kA). Next, during the sizing stage, the pulsating DC electrical current was programmed to include five electrical current pulses that were separated from one another by intermittent cooling periods (where the current level of the pulsating DC electrical current was programmed to 0 kA) lasting for 10 ms. Each of the five electrical current pulses lasted for 50 ms and was kept constant at 8 kA. When the average applied power (identified with an "x" symbol) of each electrical current pulse in the sizing stage was subjected to simple linear regression, the resultant regression line 520 had a slope greater than zero and was represented by the equation $y=0.0009t+10.287$, where (y) is the power in kW and (t) is the time in milliseconds (ms). The regression line 520 thus had a slope of 0.09 kW/100 ms.

Example 7

Figure 18:
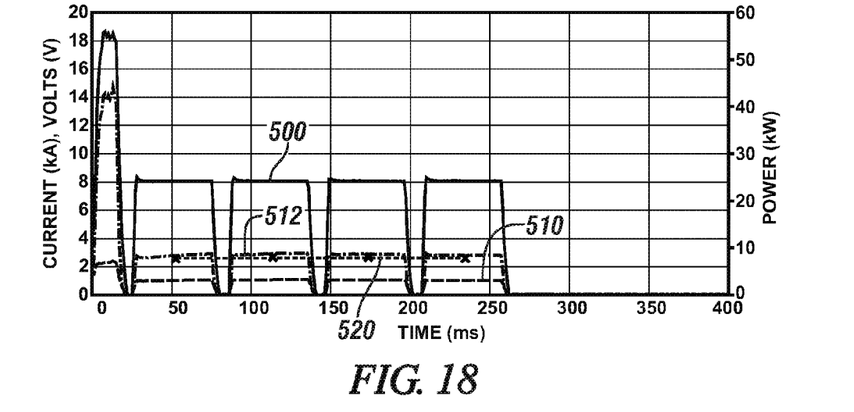
FIG. 18 is a graphical depiction of the pulsating DC electrical current, which includes a conditioning stage and a sizing stage, according to still another embodiment of the disclosure.

In this example, which corresponds to FIG. 18, a 1.6-mm thick high-strength uncoated PHS (1300 MPa) workpiece was resistance spot welded to a 1.0-mm thick uncoated Dual Phase steel (590 MPa) workpiece. The two workpieces were held together by DOW Betamate 1486 adhesive. During the conditioning stage of the pulsating DC electrical current, the current level was raised to 18 kA for a period of 15 ms, followed by a 10 ms cooling period (current level programmed to 0 kA). Next, during the sizing stage, the pulsating DC electrical current was programmed to include four electrical current pulses that were separated from one another by intermittent cooling periods (where the current level of the pulsating DC electrical current was programmed to 0 kA) lasting for 10 ms. Each of the four electrical current pulses lasted for 50 ms and was kept constant at 8 kA. When the average applied power (identified with an "x" symbol) of each electrical current pulse in the sizing stage was subjected to simple linear regression, the resultant regression line 520 had a slope greater than zero and was represented by the equation $y=0.0004t+7.793$, where (y) is the power in kW and (t) is the time in milliseconds (ms). The regression line 520 thus had a slope of 0.04 kW/100 ms.

Example 8

Figure 19:
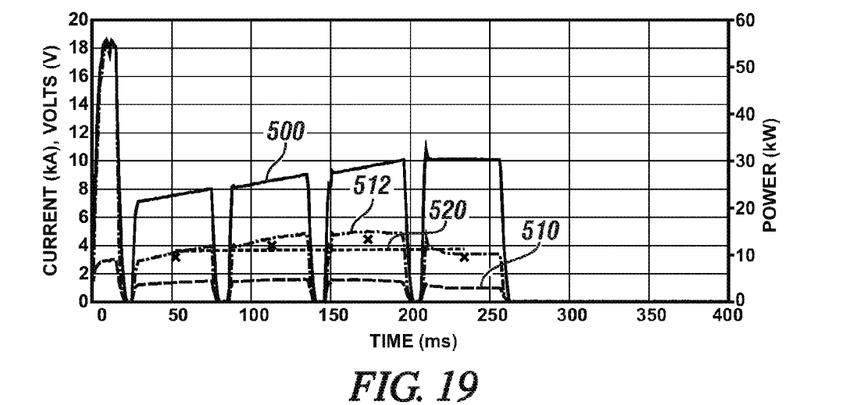
FIG. 19 is a graphical depiction of the pulsating DC electrical current, which includes a conditioning stage and a sizing stage, according to another embodiment of the disclosure.

In this example, which corresponds to FIG. 19, a 1.6-mm thick high-strength, uncoated PHS (1300 MPa) workpiece, a 0.8-mm thick uncoated HSLA steel (340 MPa) workpiece, and a 1.0-mm thick uncoated Dual Phase steel (590 MPa) workpiece were resistance spot welded together. The adjacent 1.6-mm and 0.8-mm thick workpieces were held together by DOW Betamate 1486 adhesive. During the conditioning stage of the pulsating DC electrical current, the current level was raised to 18 kA for a period of 15 ms, followed by a 10 ms cooling period (current level programmed to 0 kA). Next, during the sizing stage, the pulsating DC electrical current was programmed to include four electrical current pulses that were separated from one another by intermittent cooling periods (where the current level of the pulsating DC electrical current was programmed to 0 kA) lasting for 10 ms. The four electrical current pulses lasted for 50 ms each.

Of the four electrical current pulses included in the sizing stage, the first three had peak current levels falling within the range of about 7-10 kA, and the peak current level of each of those pulses was greater than the peak current level of each of its preceding pulses. The fourth electrical current pulse was kept constant at 10 kA and also lasted for 50 ms. When the average applied power (identified with an "x" symbol) of each electrical current pulse in the sizing stage was subjected to simple linear regression, the resultant regression line 520 had a slope greater than zero and was represented by the equation y=0.0021t+10.816, where (y) is the power in kW and (t) is the time in milliseconds (ms). The regression line 520 thus had a slope of 0.21 kW/100 ms.

Example 9

Figure 20:
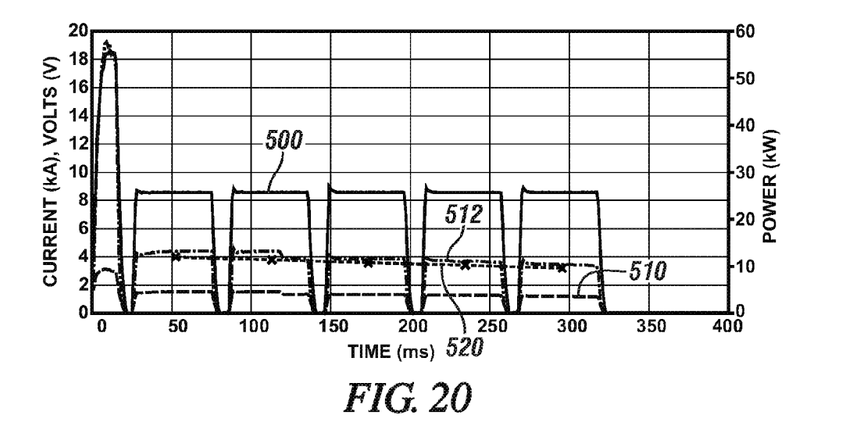
FIG. 20 is a graphical depiction of the pulsating DC electrical current, which includes a conditioning stage and a sizing stage, according to yet another embodiment of the disclosure.

In this example, which corresponds to FIG. 20, a 1.6-mm thick high-strength, uncoated PHS (1300 MPa) workpiece, a 1.0-mm thick high-strength, uncoated PHS (1300 MPa) workpiece, and a 1.1-mm thick uncoated Dual Phase steel (590 MPa) workpiece were resistance spot welded together. The adjacent 1.6-mm and 1.0-mm thick workpieces were held together by DOW Betamate 1486 adhesive. During the conditioning stage of the pulsating DC electrical current, the current level was raised to 18 kA for a period of 15 ms, followed by a 10 ms cooling period (current level programmed to 0 kA). Next, during the sizing stage, the pulsating DC electrical current was programmed to include five electrical current pulses that were separated from one another by intermittent cooling periods (where the current level of the pulsating DC electrical current was programmed to 0 kA) lasting for 10 ms. Each of the five electrical current pulses lasted for 50 ms and was kept constant at 8.5 kA. When the average applied power (identified with an "x" symbol) of each electrical current pulse in the sizing stage was subjected to simple linear regression, the resultant regression line 520 had a slope greater than zero and was represented by the equation y=−0.0098t+12.503, where (y) is the power in kW and (t) is the time in milliseconds (ms). The regression line 520 thus had a slope of −0.98 kW/100 ms.

The above description of preferred exemplary embodiments and related examples are merely descriptive in nature; they are not intended to limit the scope of the claims that follow. Each of the terms used in the appended claims should be given its ordinary and customary meaning unless specifically and unambiguously stated otherwise in the specification.

The invention claimed is:

1. A method of resistance spot welding steel workpieces, the method comprising:

providing a workpiece stack-up that includes a plurality of steel workpieces that overlap each other to establish a faying interface between each pair of adjacent steel workpieces within the workpiece stack-up at a weld site, the plurality of steel workpieces comprising at least a first steel workpiece and a second steel workpiece, the first steel workpiece having an exterior outer surface that provides a first side of the workpiece stack-up, and the second steel workpiece having an exterior outer surface that provides a second side of the workpiece stack-up, and wherein at least one of the plurality of steel workpieces within the workpiece stack-up comprises a high-strength steel substrate having a tensile strength of 1000 MPa or greater;

contacting the exterior outer surface of the first steel workpiece with a first welding electrode and contacting the exterior outer surface of the second steel workpiece with a second welding electrode, the first and second welding electrodes being pressed against their respective exterior outer surfaces in facing alignment at the weld site;

passing a pulsating DC electrical current between the first and second welding electrodes and across each faying interface present within the weld site, the pulsating DC electrical current comprising a plurality of electrical current pulses that initiates and grows a molten steel weld pool at each faying interface, wherein each of the plurality of electrical current pulses that initiates and grows the molten steel weld pool at each faying interface has an average applied power, and wherein subjecting the average applied powers of the electrical current pulses to simple linear regression results in a regression line having a slope of −1.0 kW/100 ms or greater; and ceasing passage of the pulsating DC electrical current between the first and second welding electrodes to quench and solidify the molten steel weld pool at each faying interface into a weld nugget having an outer boundary and a center, and wherein the weld nugget at each faying interface has a uniform hardness in which a Vickers hardness at any location within the outer boundary of the weld nugget does not vary by more than 10% from a Vickers hardness at the center the weld nugget.

2. The method set forth in claim 1, wherein the first steel workpiece has a faying surface that overlaps and contacts a faying surface of the second steel workpiece to establish a single faying interface within the workpiece stack-up.

3. The method set forth in claim 1, wherein the workpiece stack-up further comprises a third steel workpiece disposed between the first and second steel workpieces, the third steel workpiece having two opposed faying surfaces, wherein one faying surface of the third steel workpiece overlaps and contacts a faying surface of the first steel workpiece and the other faying surface of the third steel workpiece overlaps and contacts a faying surface of the second steel workpiece so as to establish two faying interfaces within the workpiece stack-up.

4. The method set forth in claim 1, wherein each of the plurality of electrical current pulses that initiates and grows the molten steel weld pool at each faying interface includes a ramping leg, a decay leg, and a bridge leg that connects the ramping leg and the decay leg and includes a peak current level of the pulse, and wherein the regression line that results from subjecting the average applied powers of the electrical current pulses to simple linear regression results in a regression line having a positive slope.

5. The method set forth in claim 1, wherein the pulsating DC electrical current comprises a conditioning stage and a sizing stage, the conditioning stage occurring first and the sizing stage occurring after the conditioning stage and including the plurality of electrical current pulses that initiates and grows the molten steel weld pool at each faying interface, and wherein, during the conditioning stage, the pulsating DC electrical current rises in current level to above a conditioning current threshold limit for a period of time to reduce a total interface resistance between the first and second welding electrodes without initiating melting at the faying interface of any of the plurality of steel workpieces in the workpiece stack-up, the conditioning current threshold limit being greater than a peak current level of every one of the plurality of electrical current pulses in the sizing stage.

6. The method set forth in claim 5, wherein the conditioning stage of the pulsating DC electrical current comprises:

increasing a current level of the pulsating DC electrical current to above a conditioning current threshold limit of 15 kA and maintaining the current level above the conditioning current threshold limit for a time period of 5 ms to 25 ms; and reducing the current level of the pulsating DC electrical current to below 1 kA for a time period of 5 ms to 20 ms.

7. The method set forth in claim 5, wherein, during the sizing stage of the pulsating DC electrical current, the plurality of electrical current pulses contains between three and fifteen electrical current pulses that are separated from one another by intermittent cooling periods of reduced current level, each of the electrical current pulses including a ramping leg, a decay leg, and a bridge leg that connects the ramping leg and the decay leg and lasts for a period of 30 ms to 70 ms, wherein each electrical current pulse includes a peak current level within the bridge leg that lies between 5 kA and 15 kA, and wherein during the intermittent cooling periods the current level of the pulsating DC electrical current drops to below 1 kA for a period of 5 ms to 25 ms.

8. The method set forth in claim 1, wherein the high-strength steel substrate included in at least one of the plurality of steel workpieces within the workpiece stack-up further includes a carbon content of 0.2 wt % or greater.

9. A method of resistance spot welding steel workpieces, the method comprising:

providing a workpiece stack-up that includes a plurality of steel workpieces that overlap each other to establish a faying interface between each pair of adjacent steel workpieces within the workpiece stack-up at a weld site, the plurality of steel workpieces comprising at least a first steel workpiece and a second steel workpiece, the first steel workpiece having an exterior outer surface that provides a first side of the workpiece stack-up, and the second steel workpiece having an exterior outer surface that provides a second side of the workpiece stack-up, and wherein at least one of the plurality of steel workpieces within the workpiece stack-up comprises a high-strength steel substrate having a tensile strength of 1000 MPa or greater;

contacting the exterior outer surface of the first steel workpiece with a first welding electrode and contacting the exterior outer surface of the second steel workpiece with a second welding electrode, the first and second welding electrodes being pressed against their respective exterior outer surfaces in facing alignment at the weld site;

passing a pulsating DC electrical current between the first and second welding electrodes and across each faying interface present within the weld site, the pulsating DC electrical current comprising a plurality of electrical current pulses that initiates and grows a molten steel weld pool at each faying interface, wherein the pulsating DC electrical current comprises a conditioning stage and a sizing stage, the conditioning stage occurring first and the sizing stage occurring after the conditioning stage and including the plurality of electrical current pulses that initiates and grows the molten steel weld pool at each faying interface, and wherein, during the conditioning stage, the pulsating DC electrical current rises in current level to above a conditioning current threshold limit for a period of time to reduce a total interface resistance between the first and second welding electrodes without initiating melting at the faying interface of any of the plurality of steel workpieces in the workpiece stack-up, the conditioning current threshold limit being greater than a peak current level of every one of the plurality of electrical current pulses in the sizing stage; and ceasing passage of the pulsating DC electrical current between the first and second welding electrodes to quench and solidify the molten steel weld pool at each faying interface into a weld nugget having an outer boundary and a center, and wherein the weld nugget at each faying interface has a uniform hardness in which a Vickers hardness at any location within the outer boundary of the weld nugget does not vary by more than 10% from a Vickers hardness at the center the weld nugget.

10. The method set forth in claim 9, wherein the conditioning stage of the pulsating DC electrical current comprises:

increasing a current level of the pulsating DC electrical current to above a conditioning current threshold limit of 15 kA and maintaining the current level above the conditioning current threshold limit for a time period of 5 ms to 25 ms; and reducing the current level of the pulsating DC electrical current to below 1 kA for a time period of 5 ms to 20 ms.

11. The method set forth in claim 9, wherein, during the sizing stage of the pulsating DC electrical current, the plurality of electrical current pulses contains between three and fifteen electrical current pulses that are separated from one another by intermittent cooling periods of reduced current level, each of the electrical current pulses including a ramping leg, a decay leg, and a bridge leg that connects the ramping leg and the decay leg and lasts for a period of 30 ms to 70 ms, wherein each electrical current pulse includes a peak current level within the bridge leg that lies between 5 kA and 15 kA, and wherein during the intermittent cooling periods the current level of the pulsating DC electrical current drops to below 1 kA for a period of 5 ms to 25 ms.

12. The method set forth in claim 9, wherein the high-strength steel substrate included in at least one of the plurality of steel workpieces within the workpiece stack-up further includes a carbon content of 0.2 wt % or greater.

13. The method set forth in claim 9, wherein the first steel workpiece has a faying surface that overlaps and contacts a faying surface of the second steel workpiece to establish a single faying interface within the workpiece stack-up.

14. The method set forth in claim 9, wherein the workpiece stack-up further comprises a third steel workpiece disposed between the first and second steel workpieces, the third steel workpiece having two opposed faying surfaces, wherein one faying surface of the third steel workpiece overlaps and contacts a faying surface of the first steel workpiece and the other faying surface of the third steel workpiece overlaps and contacts a faying surface of the second steel workpiece so as to establish two faying interfaces within the workpiece stack-up.

15. The method set forth in claim 9, wherein each of the plurality of electrical current pulses that initiates and grows the molten steel weld pool at each faying interface has an average applied power, and wherein subjecting the average applied powers of the electrical current pulses to simple linear regression results in a regression line having a slope −1.0 kW/100 ms or greater.

16. The method set forth in claim 15, wherein each of the plurality of electrical current pulses that initiates and grows the molten steel weld pool at each faying interface includes a ramping leg, a decay leg, and a bridge leg that connects the ramping leg and the decay leg and includes a peak current level of the pulse, and wherein the regression line that results from subjecting the average applied powers of the electrical current pulses to simple linear regression results in a regression line having a positive slope.

* * * * *